(12) United States Patent
Chang et al.

(10) Patent No.: US 11,946,559 B2
(45) Date of Patent: Apr. 2, 2024

(54) VESSEL PRESSURE REGULATING SYSTEM WITH MULTIDIRECTIONAL CONTROL VALVE DEVICE

(71) Applicant: Koge Micro Tech Co., Ltd., New Taipei (TW)

(72) Inventors: Chih Chang, New Taipei (TW); Po-Yuan Liao, New Taipei (TW)

(73) Assignee: KOGE MICRO TECH CO., LTD., Taiwan (TW)

( * ) Notice: Subject to any disclaimer, the term of this patent is extended or adjusted under 35 U.S.C. 154(b) by 166 days.

(21) Appl. No.: 17/699,442

(22) Filed: Mar. 21, 2022

(65) Prior Publication Data

US 2022/0400813 A1 Dec. 22, 2022

(30) Foreign Application Priority Data

Jun. 22, 2021 (TW) ................................. 110207222
Jun. 22, 2021 (TW) ................................. 110207223

(51) Int. Cl.
| | |
|---|---|
| *F16K 31/00* | (2006.01) |
| *F16K 11/18* | (2006.01) |
| *A43B 7/08* | (2022.01) |
| *A43B 13/20* | (2006.01) |
| *A43B 13/40* | (2006.01) |
| *A47C 27/08* | (2006.01) |
| *A47C 27/10* | (2006.01) |
| *B60N 2/66* | (2006.01) |

(52) U.S. Cl.
CPC ............ *F16K 31/002* (2013.01); *F16K 11/18* (2013.01); *F16K 31/006* (2013.01); *A43B 7/088* (2013.01); *A47C 27/082* (2013.01); *A47C 27/083* (2013.01); *A47C 27/10* (2013.01); *B60N 2/665* (2015.04)

(58) Field of Classification Search
CPC ...... F16K 31/006; F16K 31/002; F16K 11/18; A43B 13/026; A43B 13/40; A43B 7/088; A47C 27/10; B60N 2/665
USPC .................................................... 251/129.06
See application file for complete search history.

(56) References Cited

U.S. PATENT DOCUMENTS

| | | | | |
|---|---|---|---|---|
| 3,168,623 | A * | 2/1965 | Petermann | H10N 30/2042 310/330 |
| 3,614,486 | A * | 10/1971 | Smiley | B41J 9/36 251/303 |
| 4,072,959 | A * | 2/1978 | Elmqvist | B41J 2/14282 347/68 |

(Continued)

*Primary Examiner* — William M McCalister
(74) *Attorney, Agent, or Firm* — Juan Carlos A. Marquez; Marquez IP Law Office, PLLC

(57) ABSTRACT

A vessel pressure regulating system with a multidirectional control valve device includes: a pressure source; the multidirectional control valve device, which includes a housing, an actuation unit, and a working element, the housing having an interior space, an input port, and an output port, the input port being in communication with the pressure source, the actuation unit having a stationary portion and a driving portion, and the working element being controlled by the driving portion in order to open or close the output port; a vessel in communication with the output port; and a control unit for controlling the operation of the pressure source and of the driving portion. The vessel pressure regulating system enables a safety airbag of a vehicle or a similar device in a chair, bed, or the like to function effectively.

11 Claims, 12 Drawing Sheets

(56) References Cited

U.S. PATENT DOCUMENTS

| | | | | |
|---|---|---|---|---|
| 4,492,360 A * | 1/1985 | Lee, II | F16K 31/006 | 251/285 |
| 4,617,952 A * | 10/1986 | Fujiwara | F15B 5/003 | 137/625.45 |
| 4,629,926 A * | 12/1986 | Siegal | F16K 31/004 | 310/330 |
| 4,771,204 A * | 9/1988 | Siegal | F16K 31/006 | 310/330 |
| 5,340,081 A * | 8/1994 | Wright | F16K 31/005 | 251/368 |
| 5,343,894 A * | 9/1994 | Frisch | F16K 31/006 | 137/625.65 |
| 5,354,032 A * | 10/1994 | Sims | F16K 31/005 | 251/129.06 |
| 5,460,202 A * | 10/1995 | Hanley | G05D 16/2024 | 137/596.17 |
| 5,488,255 A * | 1/1996 | Sato | H02K 99/20 | 257/E23.099 |
| 5,582,590 A * | 12/1996 | Hauser | A61M 5/168 | 604/30 |
| 5,628,411 A * | 5/1997 | Mills | F16K 31/005 | 251/368 |
| 5,779,218 A * | 7/1998 | Kowanz | F15B 5/003 | 251/129.06 |
| 5,897,097 A * | 4/1999 | Biegelsen | F15C 5/00 | 251/129.01 |
| 6,024,340 A * | 2/2000 | Lazarus | F16K 31/004 | 310/365 |
| 6,142,444 A * | 11/2000 | Kluge | F15C 5/00 | 137/831 |
| 6,164,621 A * | 12/2000 | Bouchard | F16K 31/006 | 251/129.06 |
| 6,173,744 B1 * | 1/2001 | Frisch | F16K 31/006 | 137/625.65 |
| 6,220,295 B1 * | 4/2001 | Bouchard | F16K 31/006 | 137/625.65 |
| 6,315,716 B1 * | 11/2001 | Takami | A61B 1/12 | 600/560 |
| 6,450,204 B2 * | 9/2002 | Itzhaky | F16K 31/004 | 137/883 |
| 6,484,754 B1 * | 11/2002 | Muth | F16K 11/052 | 137/625.66 |
| 6,581,638 B2 * | 6/2003 | Frisch | F16K 31/004 | 137/596.17 |
| 6,703,761 B2 * | 3/2004 | Gallmeyer | H10N 30/204 | 310/330 |
| 6,799,745 B2 * | 10/2004 | Schmauser | F16K 31/005 | 310/369 |
| 6,988,706 B2 * | 1/2006 | Seeley | F16K 99/0048 | 251/129.06 |
| 7,322,376 B2 * | 1/2008 | Frisch | F16K 31/006 | 137/625.5 |
| 7,448,412 B2 * | 11/2008 | Teach | G05D 7/0694 | 137/596.17 |
| 8,196,602 B2 * | 6/2012 | Korzeniowski | E03B 7/12 | 137/563 |
| 8,556,227 B2 * | 10/2013 | Buestgens | F16K 31/006 | 310/326 |
| 8,631,825 B2 * | 1/2014 | Lee | F16K 31/006 | 137/884 |
| 8,763,638 B2 * | 7/2014 | Deubler | F17D 1/04 | 251/30.05 |
| 9,423,044 B2 * | 8/2016 | Im | F16K 31/006 | |
| 2001/0047828 A1 * | 12/2001 | Berger | F16K 31/006 | 137/596.17 |
| 2002/0059957 A1 * | 5/2002 | Frisch | F16K 31/004 | 137/596.2 |
| 2004/0177890 A1 * | 9/2004 | Weinmann | F16K 31/006 | 137/625.65 |
| 2008/0100179 A1 * | 5/2008 | Ruggeri | H10N 30/2041 | 310/332 |
| 2015/0151314 A1 * | 6/2015 | Hendricks, Sr. | B05B 12/30 | 417/474 |
| 2022/0406987 A1 * | 12/2022 | Wu | F16K 31/006 | |

* cited by examiner

ABSTRACT# VESSEL PRESSURE REGULATING SYSTEM WITH MULTIDIRECTIONAL CONTROL VALVE DEVICE

BACKGROUND OF THE INVENTION

1. Technical Field

The present invention relates to a vessel pressure regulating system with a multidirectional control valve device. More particularly, the invention relates to a vessel pressure regulating system that has a multidirectional control valve device and can be applied to a safety airbag of a vehicle or to a similar device in a chair, bed, or the like.

2. Description of Related Art

To enhance sitting comfort, some chairs are provided with a device for supporting the sitter's lumbar vertebrae or an adjustable device for supporting another part of the sitter's body. For example, the backrest of a chair may be provided therein with a lumber vertebra supporting device for forming a proper supporting surface and thereby providing sufficient support for the sitter's lumbar vertebrae.

While some lumbar vertebra supporting devices are implemented with mechanically movable elements, others are implemented with one or more inflatable fluid chambers. Such a fluid chamber may be configured as an inflatable air cushion, gas bag, or liquid bag, the shape and size of each of which will vary with the volume of the fluid contained therein.

Considering the limited mounting space available inside a chair, the technical problem to be solved by the present invention is how to integrate multiple regulating elements into a pump-valve combination device and mount this device into a chair so as to enhance sitting comfort without the device occupying too much space or incurring a high assembly cost.

BRIEF SUMMARY OF THE INVENTION

The present invention provides a vessel pressure regulating system having a multidirectional control valve device. The system is mainly intended to provide an effective system solution for enabling effective input and output of a gas/liquid into/from a safety airbag of a vehicle or a similar device in a chair, bed, or the like.

The present invention provides a vessel pressure regulating system having a multidirectional control valve device. More specifically, the system includes: a pressure source for providing a pneumatic pressure or a liquid; the multidirectional control valve device, which includes a housing, an actuation unit, and at least one working element, the housing having an interior space and being provided with at least one input port and at least two output port, the at least one input port and the at least two output port being in communication with the interior space, the at least one input port being also in communication with an output end of the pressure source, the actuation unit being provided in the interior space and having a stationary portion and at least one driving portion, and the at least one working element being provided in the interior space and controlled by the at least one driving portion in order to open or close the at least two output port; at least one vessel having an input end in communication with the at least two output port; and a control unit for controlling the operation of the pressure source and of the at least one driving portion.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1A:
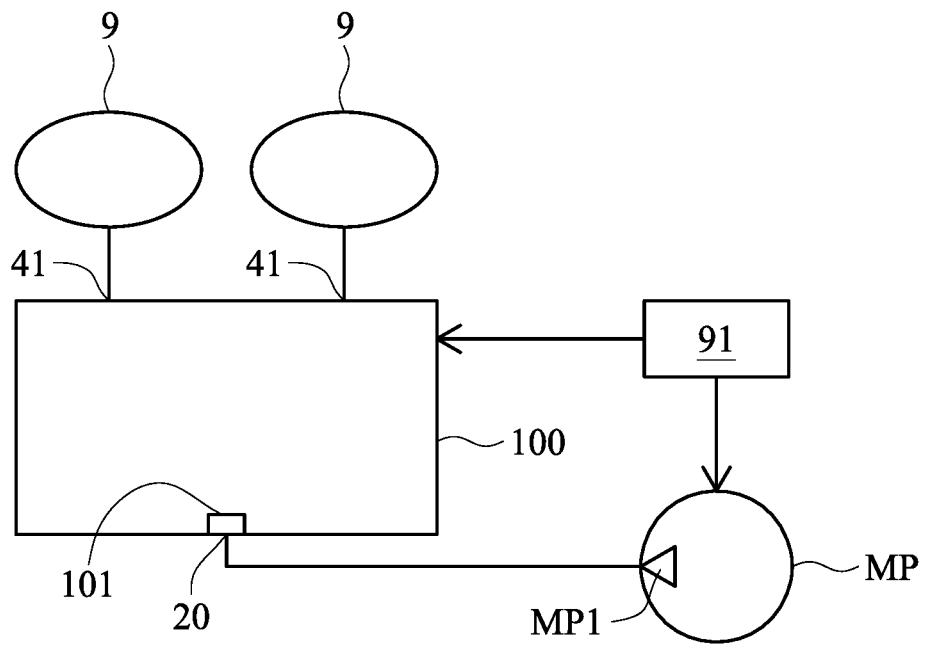
FIG. 1A is a structural diagram of a vessel pressure regulating system with a multidirectional control valve device.
Figure 1B:
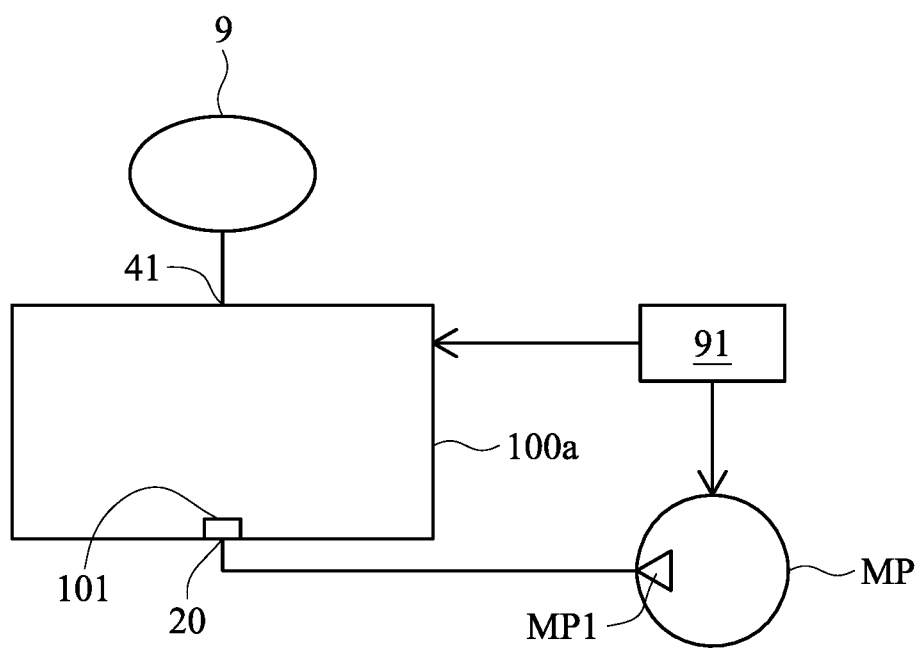
FIG. 1B is another structural diagram of the vessel pressure regulating system with the multidirectional control valve device.

Referring to FIG. 1A and FIG. 1B, one embodiment of the present invention provides a vessel pressure regulating system having a multidirectional control valve device, wherein the system includes a pressure source MP, at least one vessel 9, and a control unit 91, in addition to the multidirectional control valve device 100, 100a.

The pressure source MP is, for example, a pneumatic pump or a hydraulic pump. The pressure source MP is a pneumatic pressure or hydraulic pressure supplying unit for providing a gas or liquid and delivering the gas or liquid into an interior space 10 of a housing 1.

Figure 2:
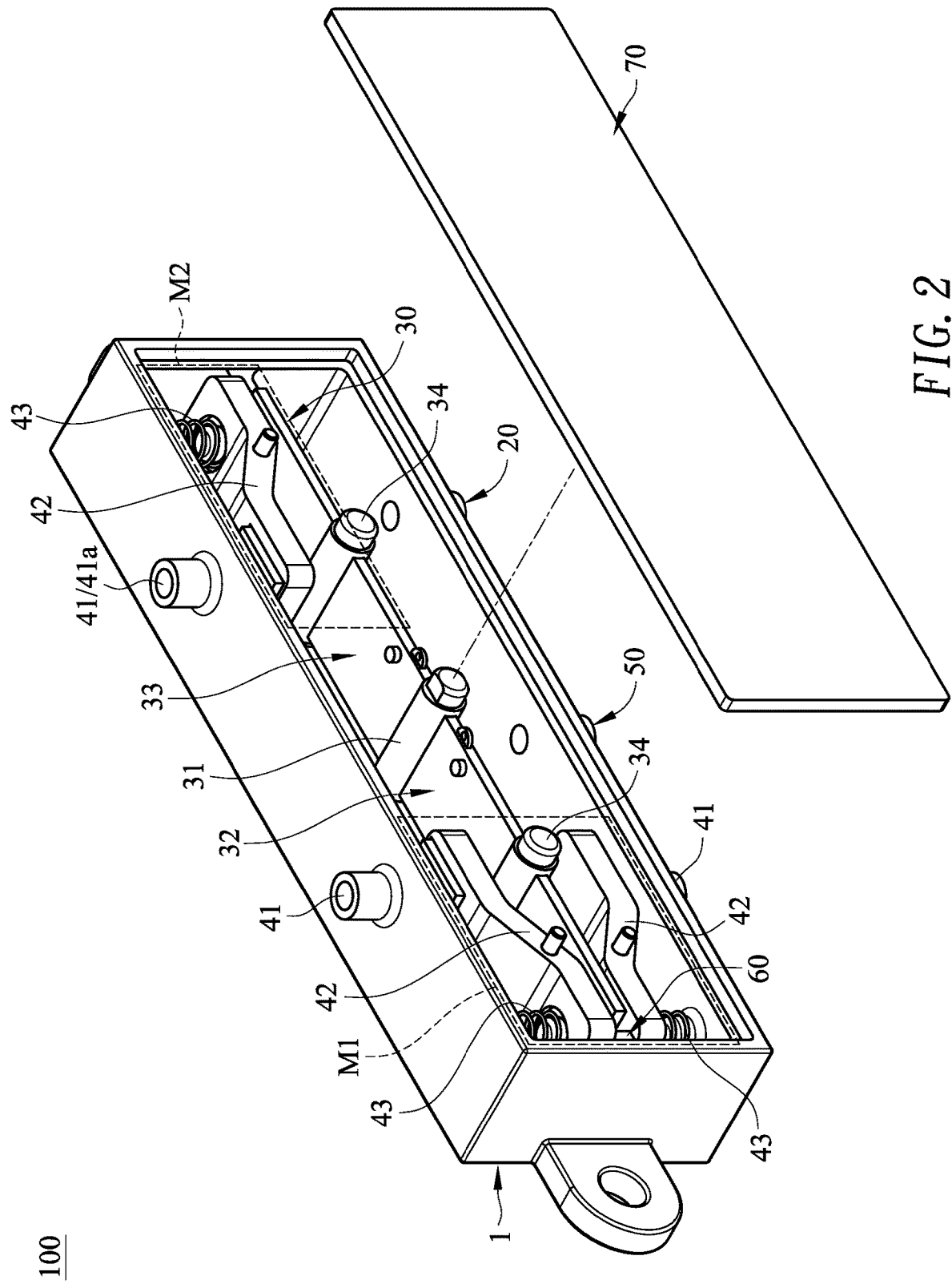
FIG. 2 is a perspective view of the first embodiment of the multidirectional control valve device.
Figure 3:
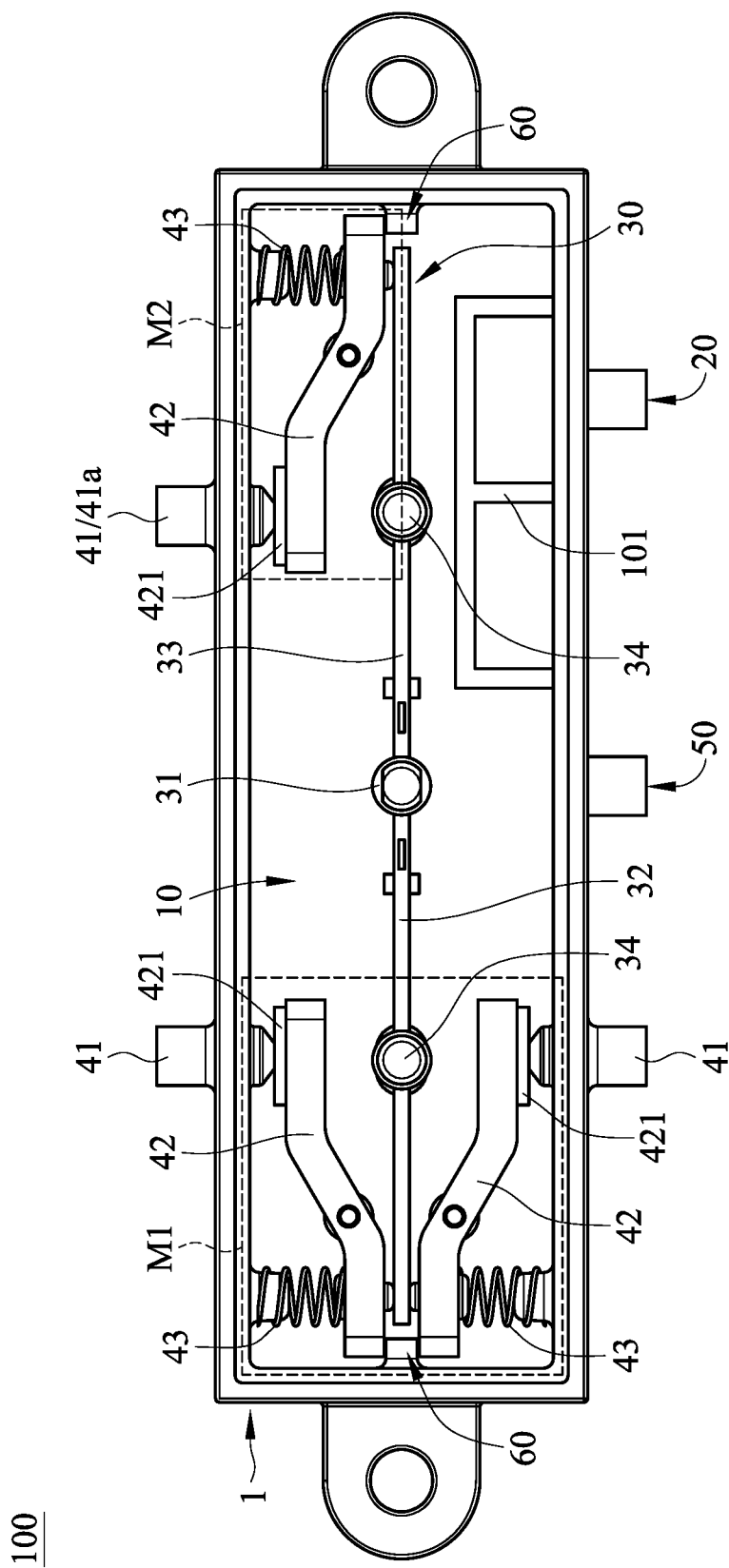
FIG. 3 is a sectional view of the first embodiment of the multidirectional control valve device.

As shown in FIG. 2 and FIG. 3, the multidirectional control valve device 100, 100a includes the housing 1, an actuation unit 30, and at least one working element 42.

The first embodiment of the multidirectional control valve device, indicated by the reference numeral 100, is described as follows.

The housing 1 of the multidirectional control valve device 100 is covered with a cover plate 70 to form the closed interior space 10 of the housing 1. The housing 1 is further provided with at least one input port 20 and at least one output port 41, both in communication with the interior space 10. The at least one input port 20 is also in communication with an output end of the pressure source MP so that the gas or liquid provided by the pressure source MP can be introduced into the interior space 10 effectively.

Figure 4:
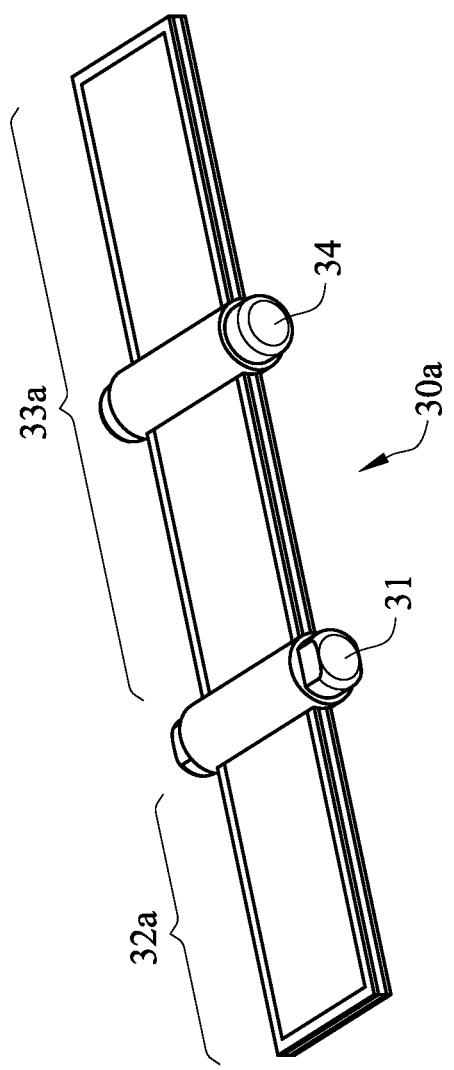
FIG. 4 is a top perspective showing a first driving portion and a second driving portion forming arms of force of different lengths respectively.
Figure 5:
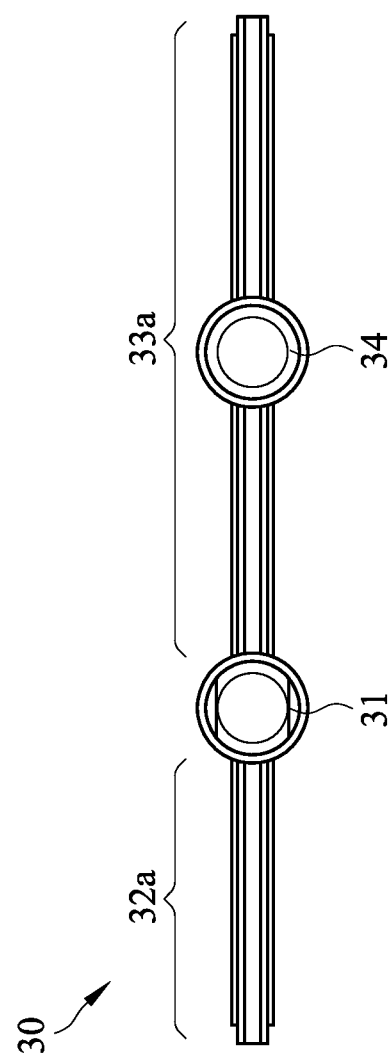
FIG. 5 is a side view showing the first driving portion and the second driving portion forming arms of force of different lengths respectively.

As shown in FIG. 4 and FIG. 5, the actuation unit 30 is provided in the interior space 10 and has a stationary portion 31 and at least one driving portion 32, 33. The actuation unit 30 may be composed of at least one intelligent material, which may be a memory metal, a thermoelectric material, a piezoelectric material, and/or a thermally deformable material.

The stationary portion 31 may be provided at an arbitrary position along the actuation unit 30 such that the actuation unit 30 forms a first driving portion 32 and a second driving portion 33. By fine-tuning the position where the stationary portion 31 is provided along the actuation unit 30 and thereby allowing the first driving portion 32 and the second driving portion 33 to form arms of force of the same length or of different lengths respectively, the first driving portion 32 and the second driving portion 33 can be provided with the same actuating ability or with different actuating abilities respectively.

When one of the first driving portion 32 and the second driving portion 33 is longer than the other, a supporting member 34 can be used to increase the structural strength of the longer driving portion and produce a variation in design. The supporting member 34 also allows the actuation unit 30 to be provided more securely in the interior space 10 of the housing 1 or be more widely used in various valve products than without the supporting member 34.

Figure 6:
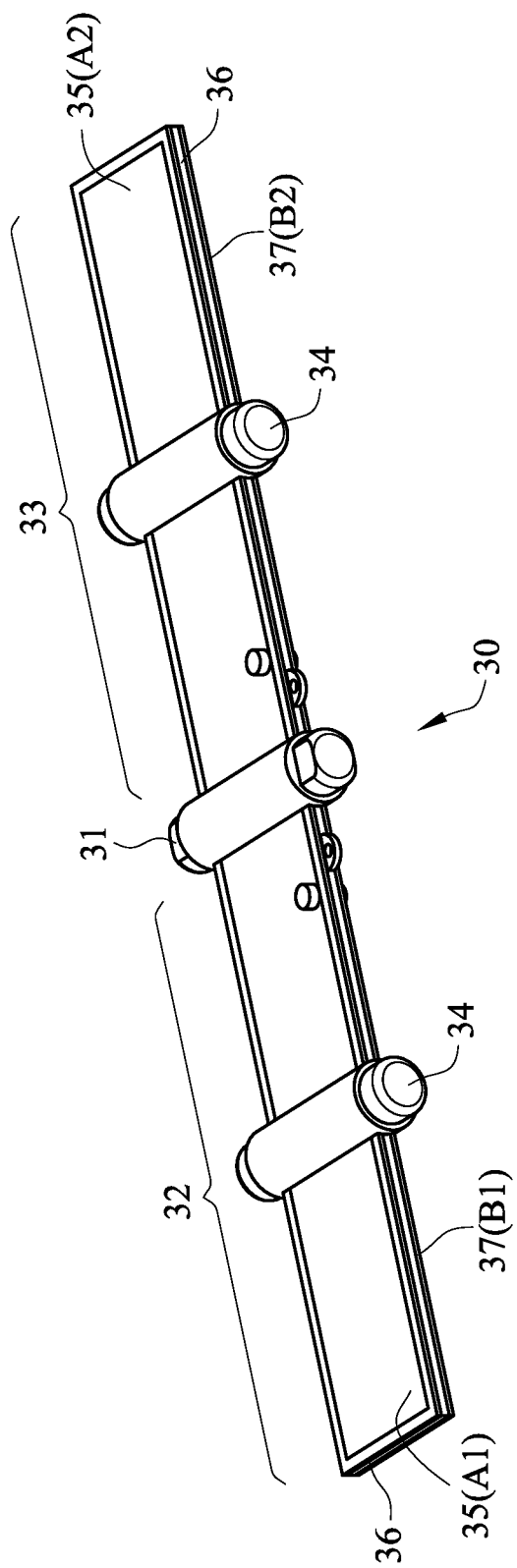
FIG. 6 is a top perspective view of an actuation unit.
Figure 7:
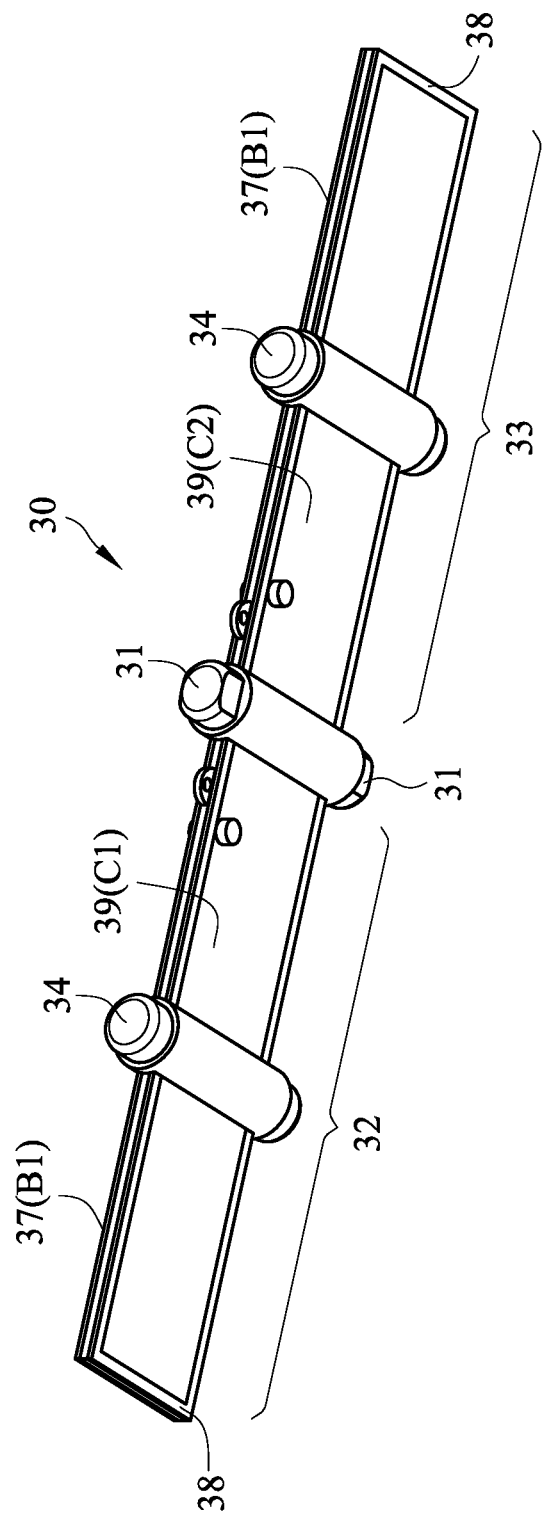
FIG. 7 is a bottom perspective view of the actuation unit.
Figure 8:
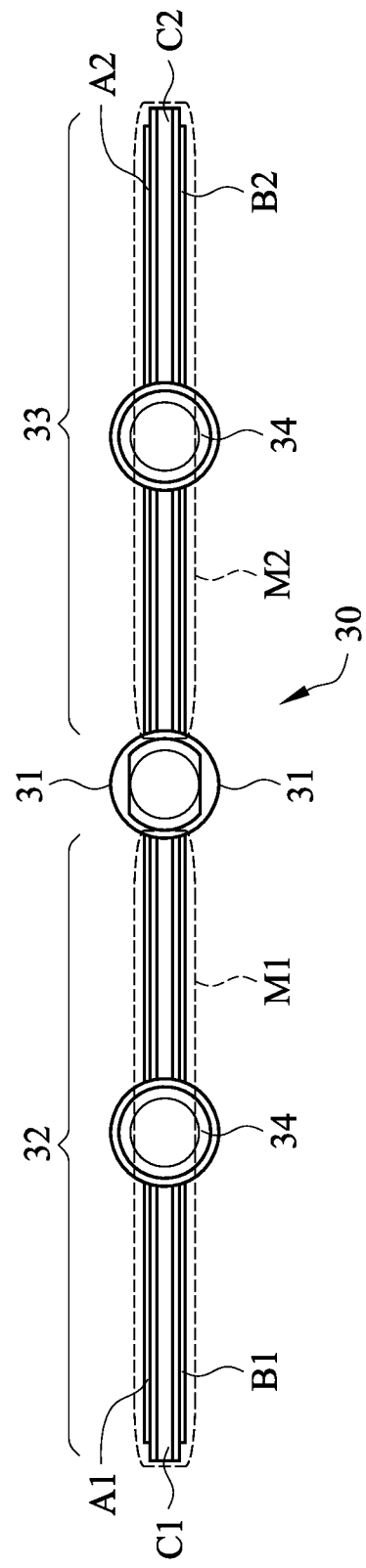
FIG. 8 is a side view of the actuation unit.

As shown in FIG. 6 to FIG. 8, each of the first driving portion 32 and the second driving portion 33 of the actuation unit 30 has at least one electrode that can be independently driven so that each driving portion can be independently actuated to produce a driving force. The actuation unit 30 may be composed of a stack of multiple layers of structures including a first electrode layer 35, a first piezoelectric plate 36, an interlayer electrode 37, a second piezoelectric plate 38, and a second electrode layer 39, stacked up in the foregoing order.

When the stationary portion 31 is provided at an intermediate position along the actuation unit 30, the first electrode layer 35 forms a first A electrode A1 and a second A electrode A2, which are isolated from each other; the second electrode layer 39 forms a first B electrode B1 and a second B electrode B2, which are isolated from each other; and the interlayer electrode 37 forms a first C electrode C1 and a second C electrode C2, which are isolated from each other.

As shown in FIG. 2 to FIG. 8, the working elements 42 are provided in the interior space 10 and are disposed on the housing 1 in a rotatable manner. Each working element 42 can be driven by the corresponding driving portion 32 or 33 such that a pressing end 421 of the working element 42 separates from or seals the corresponding output port 41 and thereby opens or closes the corresponding output port 41. The lever motion of each working element 42 allows the gas or liquid provided by the pressure source MP to be effectively delivered to the corresponding output port 41 as the multidirectional control valve is efficiently driven.

To effectively return each working element 42 to its original position after the working element 42 is driven by the actuation unit 30, a movable member 43 may be further provided between one side of each working element 42 and the housing 1, wherein the movable member 43 may be an elastic plate, a spring, a spring leaf, or the like. The present invention has no limitation on the material or number of the movable members 43.

By effecting a lever motion of a certain working element 42 through the first driving portion 32 or the second driving portion 33 in conjunction with the corresponding movable member 43, opening or closing of the corresponding output port 41 can be achieved.

When the actuation unit 30 is operated, the first driving portion 32 can be deformed in different directions, depending on how the electric field applied to the first A electrode A1, the first B electrode B1, and the first C electrode C1, which are in a first actuation area M1 corresponding to the first driving portion 32, is controlled. By the same token, the second driving portion 33 can be deformed in different directions, depending on how the electric field applied to the second A electrode A2, the second B electrode B2, and the second C electrode C2, which are in a second actuation area M2 corresponding to the second driving portion 33, is controlled.

The first A electrode A1, the first B electrode B1, the first C electrode C1, the second A electrode A2, the second B electrode B2, and the second C electrode C2 are independent, and electrically isolated, from one another, although it is feasible for the first C electrode C1 and the second C electrode C2 to either be electrically independent electrodes or be electrically connected to form a common electrode.

To prevent excessive position restoration of the working elements 42, at least one stop member 60 may be further provided on the housing 1 and in the interior space 10, with each stop member 60 and the corresponding movable member 43 provided on two opposite sides of the corresponding working element 42 respectively. By preventing excessive position restoration of the working elements 42, the stop members 60 protect the driving portions 32 and 33 from damage by excessive position restoration of the working elements 42.

Figure 9:
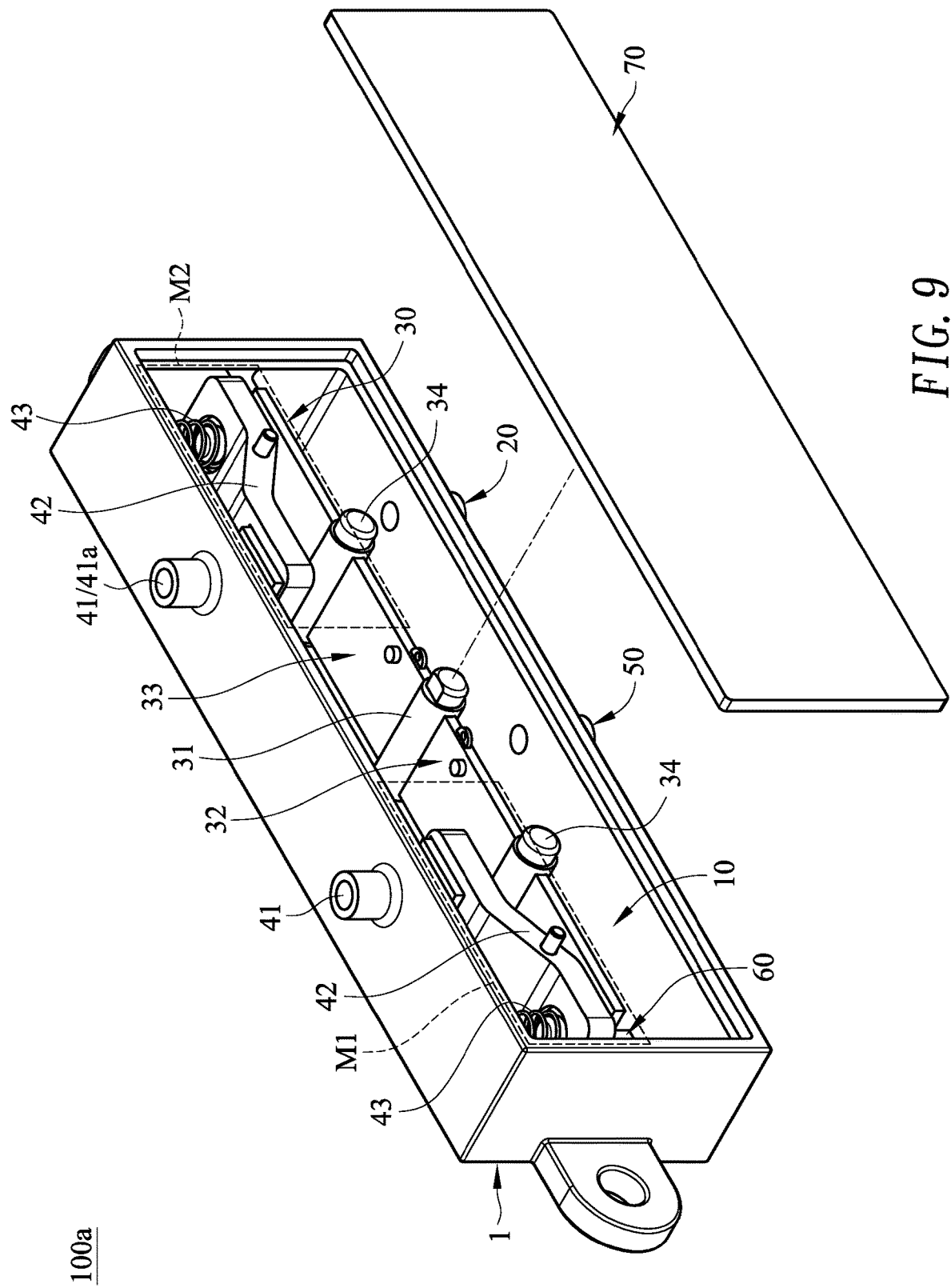
FIG. 9 is a perspective view of the second embodiment of the multidirectional control valve device.
Figure 10:
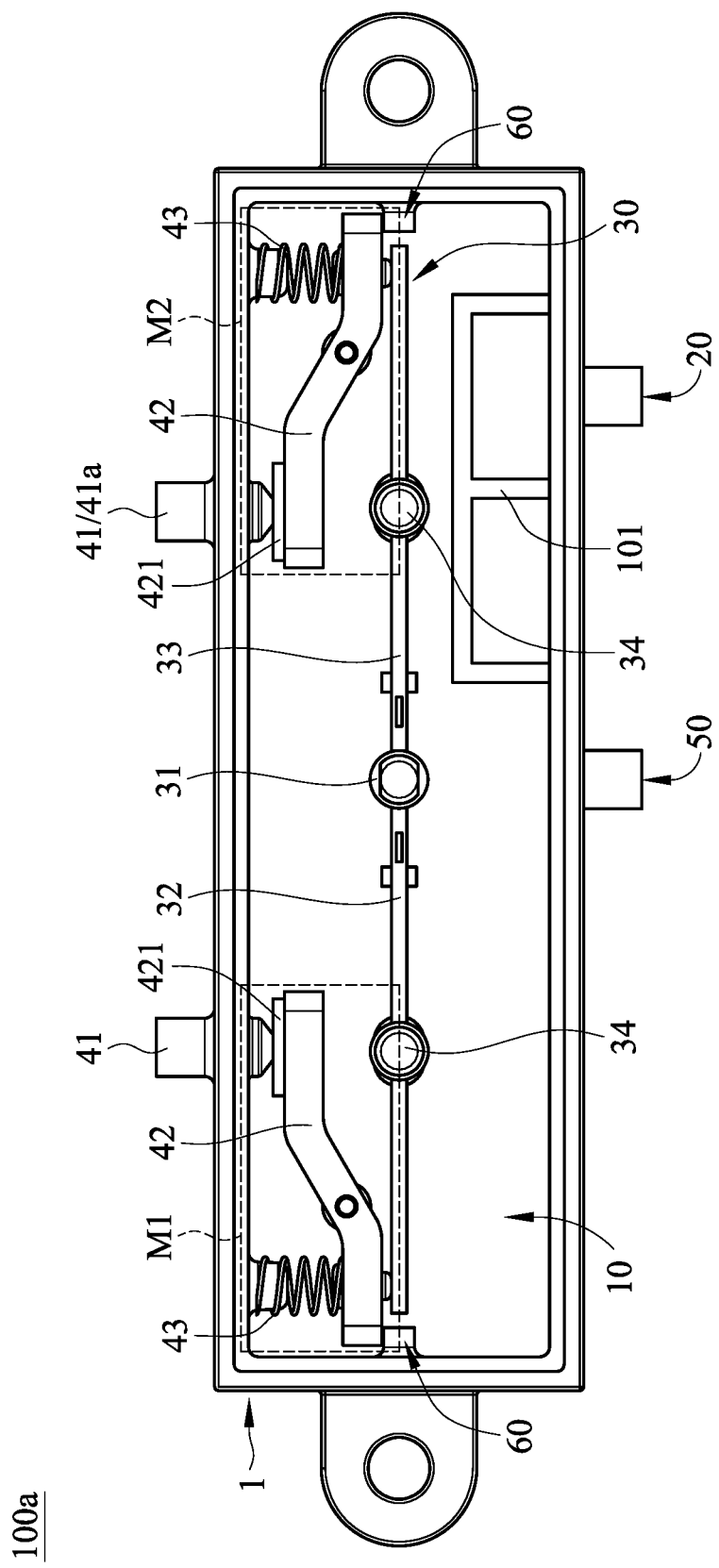
FIG. 10 is a sectional view of the second embodiment of the multidirectional control valve device.

The second embodiment of the multidirectional control valve device, indicated by the reference numeral 100a, is described below with reference to FIG. 9 and FIG. 10.

Identical or similar elements in the multidirectional control valve devices 100 and 100a are indicated by the same reference numeral or by similar reference numerals respectively and will not be described repeatedly. The multidirectional control valve device 100a is different from the multidirectional control valve device 100 mainly in that the first actuation area M1 and the second actuation area M2 in the multidirectional control valve device 100a are provided on only one side of the actuation unit 30.

The first driving portion 32 of the actuation unit 30 can be used to open or close the single output port 41 in the first actuation area M1, and the second driving portion 33 can be used to open or close the single output port 41 in the second actuation area M2. As in the first embodiment, the first driving portion 32 and the second driving portion 33 can be provided with the same actuating ability or with different actuating abilities respectively by fine-tuning the position where the stationary portion 31 is provided along the actuation unit 30.

As shown in FIG. 1 to FIG. 10, the at least one vessel 9 has an input end in communication with the at least one output port 41 of the multidirectional control valve device 100 or of the multidirectional control valve device 100a. The at least one vessel 9 may be a safety airbag of a vehicle, a liquid bag, a gas cylinder, or a container of any other form.

To prevent the gas or liquid output by the pressure source MP from flowing back, a check valve MP1 may be connected between the pressure source MP and the at least one input port 20. It is also feasible to have the check valve MP1 provided inside the pressure source MP or on the housing 1 or provided on the inner side of and connected to the at least one input port 20 so that by providing the check valve MP1, the delivery direction of the gas or liquid in use can be effectively controlled to prevent backflow. The present invention has no limitation on the location or number of the check valve MP1.

To prevent outputting undesirable impurities, the pressure source MP may be connected to a filter element 101 for filtering the gas or liquid in use. The filter element 101 may alternatively be provided on the housing 1 or inside the at least one input port 20. The present invention has no limitation on the location or number of the filter element 101.

To effectively monitor the pressure state of the interior space 10, a pressure sensor 50 for detecting the pressure of the gas or liquid in the interior space 10 may be connected to the housing 1. The pressure sensor 50, if present, will be in signal communication with the control unit 91.

To enable effective pressure relief from inside the at least one vessel 9, the housing 1 may further have a pressure relief port 41a, and the at least one output port 41 may serve as the pressure relief port 41a.

Figure 11:
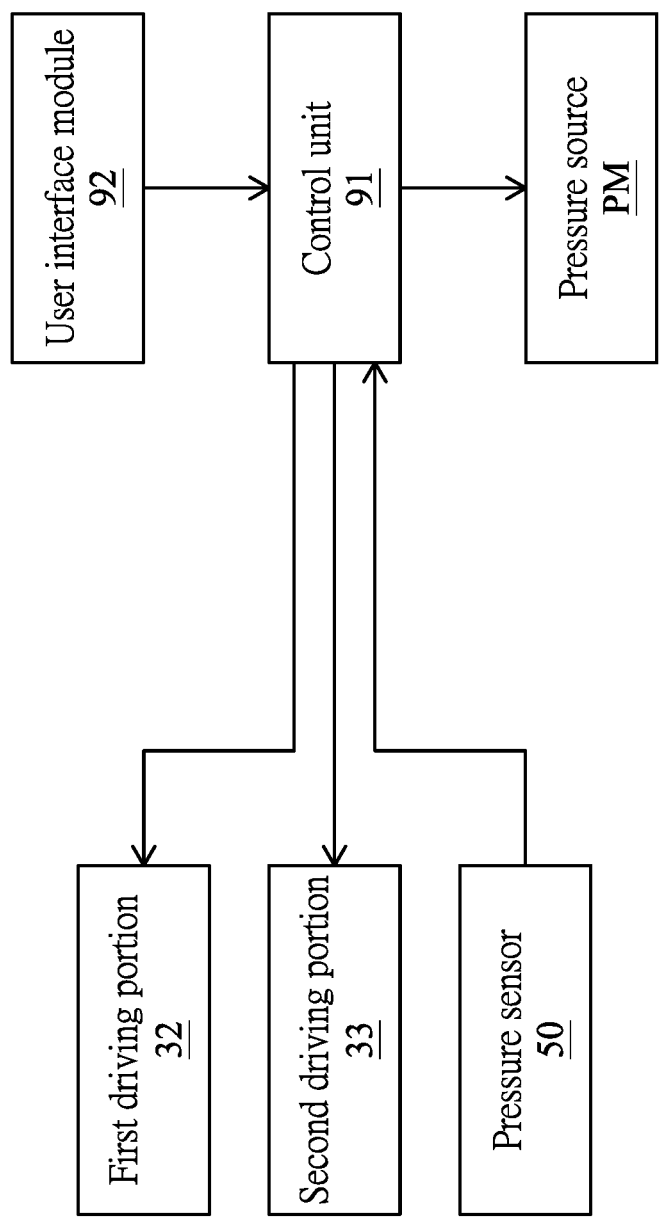
FIG. 11 shows a circuit system according to the present invention.
Figure 12:
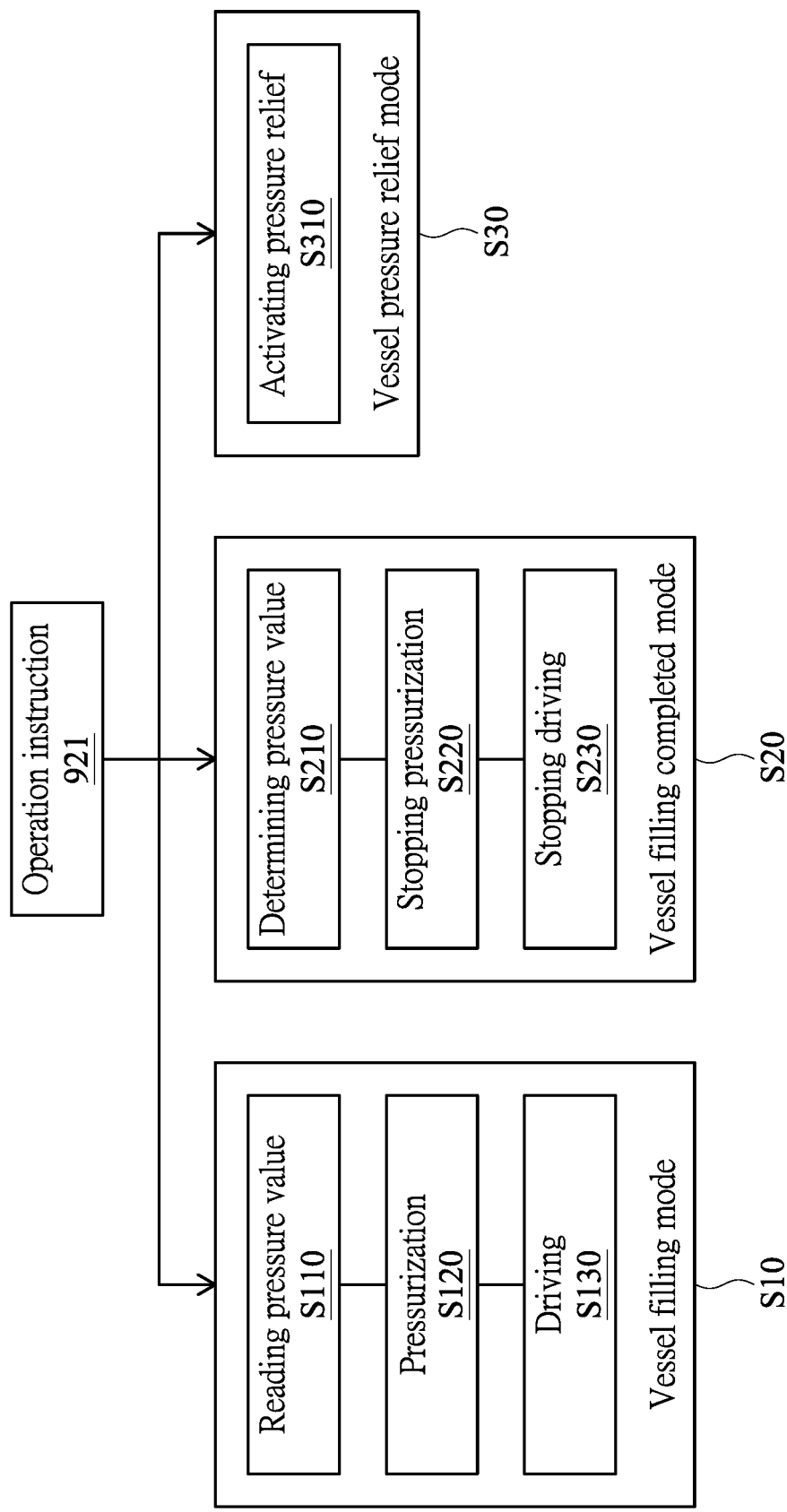
FIG. 12 is a flowchart showing the control modes of a control unit.

As shown in FIG. 11 and FIG. 12, the control unit 91 is configured to read the output signal of the pressure sensor 50 and control the operation of the pressure source MP and of the at least one driving portion 32, 33. After receiving an operation instruction 921 from the user interface module 92, the control unit 91 enters, and performs the steps corresponding to, the specified one or ones of the following control modes:

The vessel filling mode S10, which involves the steps of: reading a pressure value (S110), in which step the control unit 91 reads the pressure data of the pressure sensor 50 as a basis on which to determine whether the pressure source MP should begin pressurization;

pressurization (S120), in which step the control unit 91 actuates the pressure source MP in order for the pressure source MP to output a gas or liquid to the interior space 10 of the housing 1; and driving (S130), in which step the control unit 91 actuates the at least one driving portion 32, 33 in order for the at least one driving portion 32, 33 to drive the at least one working element 42 and thereby bring the at least one output port 41 into an open state, allowing the gas or liquid in the interior space 10 to enter the at least one vessel 9 and thus filling the at least one vessel 9 with the gas or liquid.

The vessel filling completed mode (S20), which involves the steps of:

determining the pressure value (S210), in which step the control unit 91 reads the pressure data of the pressure sensor 50 and determines whether the filling of the at least one vessel 9 is completed;

stopping pressurization (S220), in which step the control unit 91 stops the pressure source MP from outputting the gas or liquid if the pressure sensor 50 indicates that a pressure showing that the at least one vessel 9 has been fully filled is reached; and stopping driving (S230), in which step the control unit 91 stops the at least one driving portion 32, 33 from driving the at least one working element 42 and thereby brings the at least one output port 41 back to the normally closed state.

The vessel pressure relief mode (S30), which involves the step of: activating pressure relief (S310), in which step the control unit 91 makes the at least one driving portion 32, 33 drive the at least one working element 42 in order for the at least one output port 41, or the at least one output port 41 and the pressure relief port 41a, to enter an open state, thereby allowing the gas or liquid in the at least one vessel 9 to flow back to the interior space 10 or be further discharged from the interior space 10; and in which step the pressure source MP is not actuated by the control unit 91 and therefore will not output any gas or liquid.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A vessel pressure regulating system with a multidirectional control valve device, comprising:
   a pressure source for providing a pneumatic pressure or a liquid;
   the multidirectional control valve device, comprising:
   a housing having an interior space, wherein the housing is provided with at least one input port and at least two output port, the at least one input port and the at least two output port are in communication with the interior space, and the at least one input port is in communication with an output end of the pressure source;
   an actuation unit provided in the interior space and having a stationary portion and at least one driving portion; and
   at least one working element provided in the interior space and controlled by the at least one driving portion so as to open or close the at least two output port;
   at least one vessel having an input end in communication with the at least two output port; and
   a control unit for controlling operation of the pressure source and of the at least one driving portion;
   wherein the stationary portion is provided at an arbitrary position along the actuation unit such that a first driving portion and a second driving portion are formed, and by fine-tuning the position of the stationary portion, the first driving portion and the second driving portion are provided with a same actuating ability or with different actuating abilities respectively;
   wherein each of the first driving portion and the second driving portion has at least one independent electrode;
   wherein the at least one vessel is an airbag, a gas bag, or a gas cylinder.

2. The vessel pressure regulating system of claim 1, wherein the pressure source is a pneumatic pressure or hydraulic pressure supplying unit.

3. The vessel pressure regulating system of claim 1, wherein the actuation unit is at least one intelligent material selected from the group consisting of a memory metal, a thermoelectric material, a piezoelectric material, and a thermally deformable material.

4. The vessel pressure regulating system of claim 1, wherein the actuation unit further comprises at least one supporting member provided at an intermediate position along one of the at least one driving portion.

5. The vessel pressure regulating system of claim 1, further comprising at least one movable member provided between one side of the at least one working element and the housing, wherein the at least one movable member is an elastic plate, a spring, or a spring leaf.

6. The vessel pressure regulating system of claim 5, further comprising at least one stop member provided on the housing and in the interior space, wherein the at least one stop member and the at least one movable member are provided on two opposite sides of the at least one working element respectively.

7. The vessel pressure regulating system of claim 1, further comprising a check valve connected between the pressure source and the at least one input port.

8. The vessel pressure regulating system of claim 1, wherein the pressure source is connected to a filter element for filtering a gas or a liquid.

9. The vessel pressure regulating system of claim 1, wherein the housing is connected with a pressure sensor for detecting a pressure of a gas or the liquid in the interior space, and the pressure sensor is in signal communication with the control unit.

10. The vessel pressure regulating system of claim 1, wherein the housing has a pressure relief port.

11. The vessel pressure regulating system of claim 1, further comprising a sealing device provided between the at least one working element and the at least two output port.

\* \* \* \* \*